United States Patent
Korah et al.

(10) Patent No.: US 7,965,822 B2
(45) Date of Patent: Jun. 21, 2011

(54) TELEPHONY DIALING USING SPEECH RECOGNITION

(75) Inventors: Sarah Korah, San Jose, CA (US); John Vuong, San Jose, CA (US); Jih-Ling Chiou, San Jose, CA (US)

(73) Assignee: Siemens Enterprise Communications, Inc., Boca Raton, FL (US)

(*) Notice: Subject to any disclaimer, the term of this patent is extended or adjusted under 35 U.S.C. 154(b) by 1077 days.

(21) Appl. No.: 11/238,336

(22) Filed: Sep. 28, 2005

(65) Prior Publication Data

US 2007/0081661 A1    Apr. 12, 2007

(51) Int. Cl.
   *H04M 1/64* (2006.01)
(52) U.S. Cl. .............. 379/88.03; 379/88.04; 455/415
(58) Field of Classification Search .......... 379/207.14, 379/67.1, 88.01–88.04; 455/563, 415
   See application file for complete search history.

(56) References Cited

U.S. PATENT DOCUMENTS

| | | | | |
|---|---|---|---|---|
| 5,504,805 A * | 4/1996 | Lee | | 379/88.03 |
| 5,930,336 A * | 7/1999 | Junqua et al. | | 379/88.03 |
| 6,285,872 B1 * | 9/2001 | Murata | | 455/415 |
| 6,396,906 B1 * | 5/2002 | Kaplan | | 379/67.1 |
| 6,418,328 B1 * | 7/2002 | Shon | | 455/563 |

* cited by examiner

*Primary Examiner* — Md S Elahee

(57) ABSTRACT

A system and method of dialing a telephone number included in a voice mail or telephone conversation, including recognizing a telephone number present in the speech received by a telephone apparatus from a stored message, an automated voice response system, or a live conversation is described. The system interprets a user-spoken command to select a recently received telephone number and formulate a dialing sequence to connect the user to the selected telephone number. The associated voice mail, automated response or live conversation may be placed on hold, disconnected, or conferenced with the number selected.

20 Claims, 2 Drawing Sheets

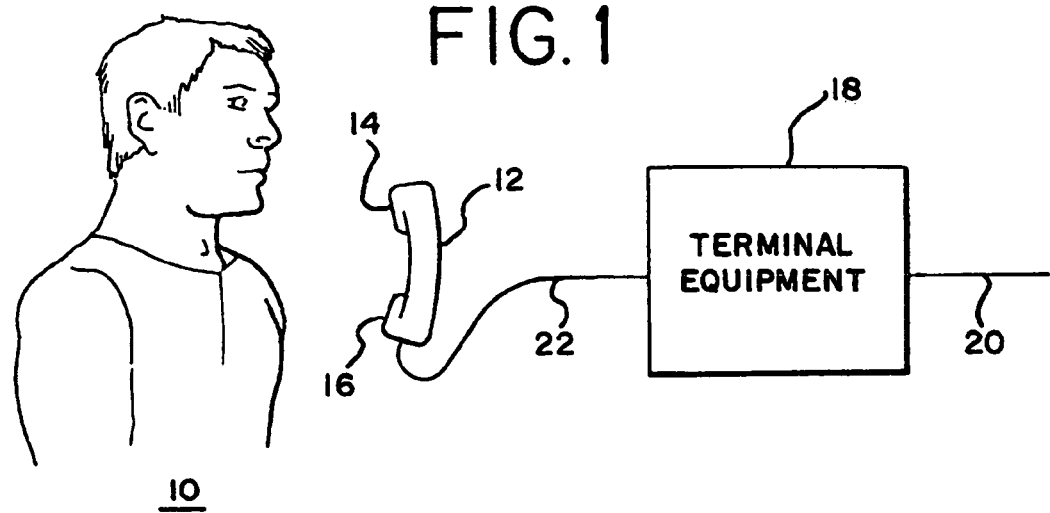
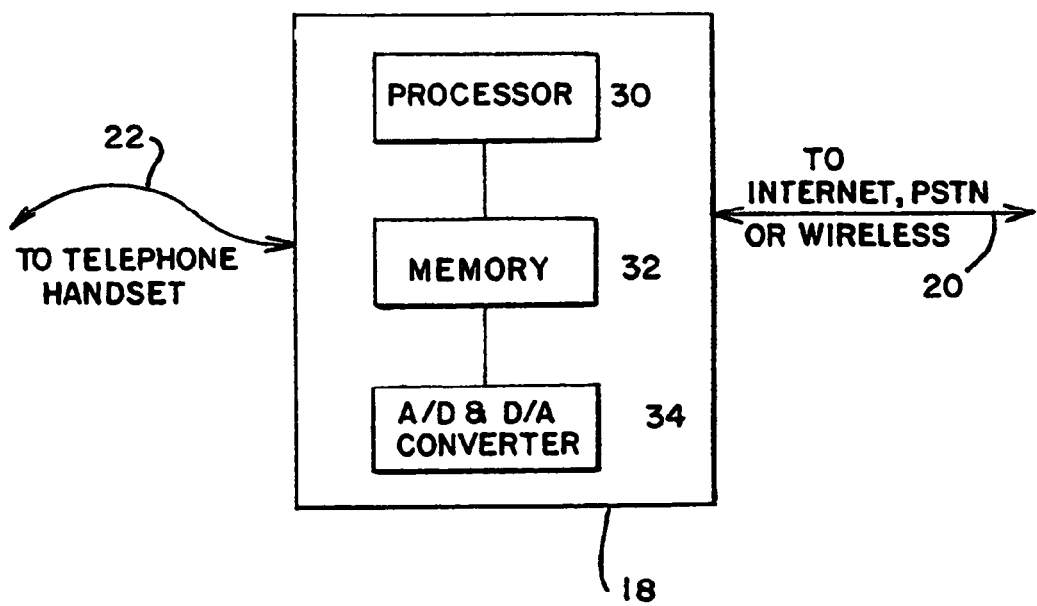

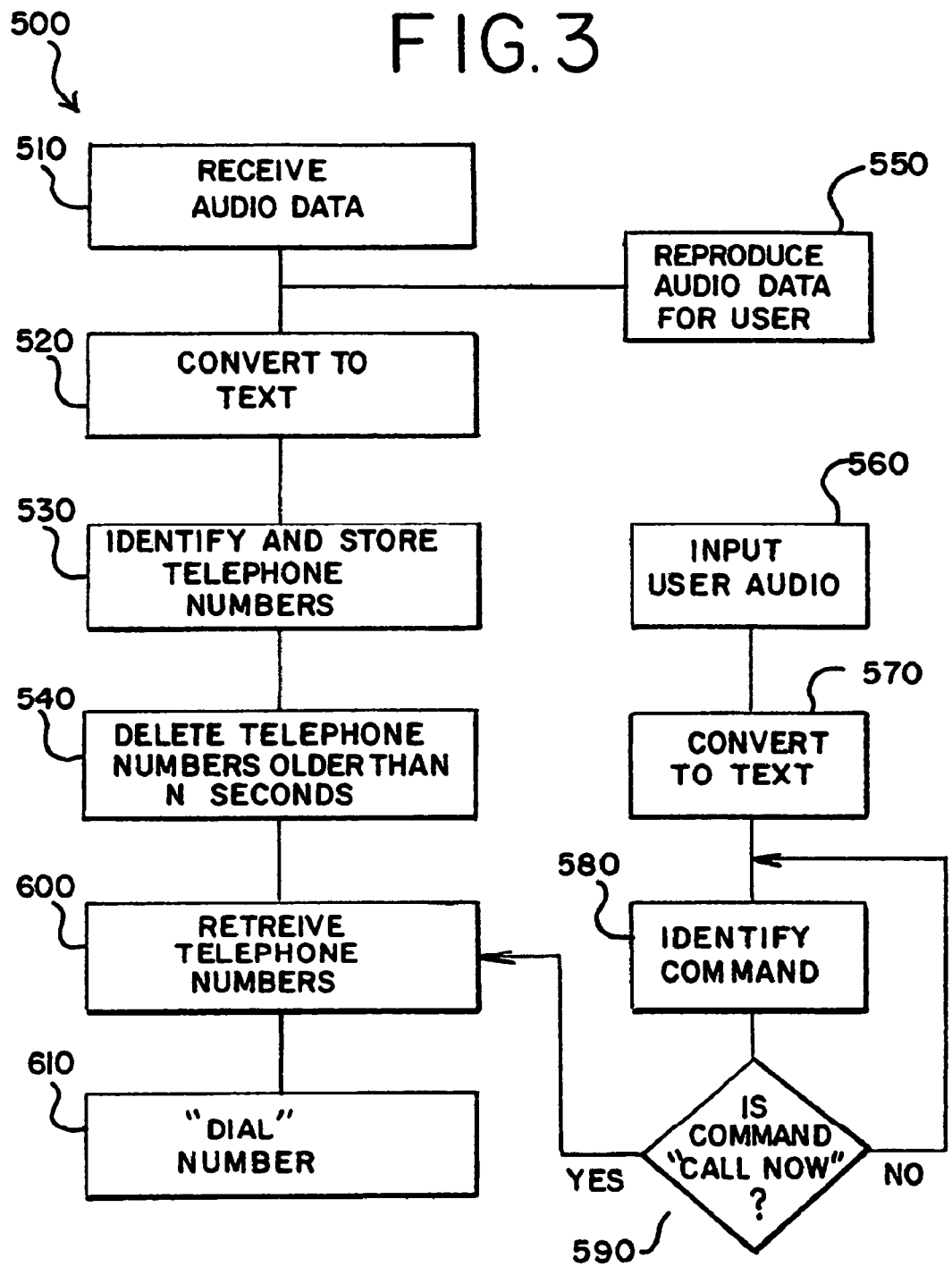

TELEPHONY DIALING USING SPEECH RECOGNITION

TECHNICAL FIELD

This application relates to voice initiated automatic dialing of telephone numbers contained in speech received by a telephone apparatus.

BACKGROUND

Telephone facilities have evolved from conventional dial-up circuit-switched connections using dedicated circuits for the duration of a telephone call, to packet switched connections using the Internet or other digital network to carry the audio waveforms of speech in digital format along with other digital data including streaming video, multicasting and web surfing. A similar evolution in technology, in volume of calls and in the functionality of handsets, has occurred in cellular radio, where a number of different wireless protocols, such as AMPS, CDPA and GSM, and newer generations (e.g., so called "third generation") provide for wide coverage, call forwarding and roaming.

One particularly time consuming and error prone aspect of telephone use is listening to voice mail and transcribing the telephone number left by a caller in order to place a return call. Commonly, a pencil or paper is not at hand, particularly when a mobile or portable handset is used. But, even with multiple handsets in a home, this can be an inconvenience. In the case of mobile operation, it can be a safety hazard. Features such as caller ID may serve to identify the originating telephone number and may be useable to return a missed call. However, when a voice message is left as "voice mail," a return telephone number or an alternative telephone number may be left in the form of a voice message.

BRIEF DESCRIPTION OF THE DRAWINGS

FIG. 1 is a block diagram of a system including a telephone handset, a signal processor and a network connection in one embodiment;

FIG. 2 is a block diagram of one embodiment of a processor and data storage apparatus; and FIG. 3 is a flow diagram of an embodiment for a method of interpreting audio signals to provide for a number to be dialed.

DETAILED DESCRIPTION

Exemplary embodiments may be better understood with reference to the drawings, but these examples are not intended to be of a limiting nature. Like numbered elements in the same or different drawings perform equivalent functions.

Using one or more processors, a telephone number or other contact information is automatically extracted from audio data. The extracted information is usable, such as to call or store number, by the recipient of the audio data.

A system and method are described for processing and interpreting audio signals using a speech recognition application program to recognize and store information including a communications address, such as a telephone number, which is an information part of the audio waveform received by a telephone apparatus; interpreting the speech of a user in the form of a functional command and retrieving the appropriate telephone number in accordance with the functional command; and, initiating a connection to the entity represented by the communications address. The system and method also provide for disposition of the first call, which may be one of a voice mail, automated response system dialog, or live conversation. The disposition may be, for example, one or more of placing the call on hold, disconnecting the call, or joining the call to the called number to form a conference call.

The processing of a transmitted or received speech signal may be by either analog or digital circuitry, or a combination thereof. The processing may be also performed by one or more computers or processors with associated memory and machine-readable computer code which results in the performance of mathematical and logical operations and functions. Functions such as analog-to-digital conversion and digital-to-analog conversion are performed to transform the speech and other information into representations suitable for the appropriate hardware or software. Herein, there is not intended to be a restriction of the type of circuit which performs a function, or the combination of types of circuits which may be used, although the examples may mention a specific type of circuit in the description thereof.

The instructions for implementing processes of a client application on a computer or processor, and the processes of a server, are provided on computer- or machine-readable storage media or memories, such as a cache, buffer, RAM, removable media, hard drive or other computer readable storage media. Computer readable storage media include various types of volatile and nonvolatile storage media. The functions, acts or tasks illustrated in the figures or described herein may be executed in response to one or more sets of instructions stored in or on computer readable storage media. The functions, acts or tasks are independent of the particular type of instruction set, storage media, processor or processing strategy and may be performed by software, hardware, integrated circuits, firmware, microcode and the like, operating alone or in combination. Likewise, processing strategies may include multiprocessing, multitasking, parallel processing and the like. In an embodiment, the instructions may be stored on a removable media device for reading by local or remote systems. In other embodiments, the instructions may be stored in a remote location for transfer through a computer network, a local or wide area network or over telephone lines. In yet other embodiments, the instructions are stored within a given computer or system.

A system and method are described for initiating and facilitating a voice telephone conversation between two or more parties, where the telephone number for the party to be called is extracted from the voice context by a speech recognition program, and the act of initiating the connection between the calling party and the party to be called is initiated by a command of the calling party. It should be understood that either the calling party or the party to be called may be a human or an apparatus performing the function of providing an appropriate speech response.

The terms "calling party", "called party", "calling entity" or "called entity" and the like are intended to connote one or more devices in proximity to humans for purposes of voice communications. One or more of the devices may emulate a human, such as an automated voice response device having the ability to initiate or respond to a spoken dialog with a human over a communications network.

In one aspect, a voice mail message may be left in a storage device by a calling party, such as when the called party does not answer the call. A message may also be a voice mail message left in a storage device by a process where the voice message is left in the storage device, and a notification of a message sent to the user, without first notifying the receiving party by traditional means such as a telephone ring. Such messages may originate as voice utterances of a human, or be generated by a voice synthesizer from a digital text stream which may have originated as an email, but delivered to the recipient by audio, the message being converted from stored digital data to a voice signal by the voice mail process. Notification of a voice mail message may be provided by an email, an alteration in the dial tone when the telephone is picked up to make a call, an illuminated indicator, either steady or flashing, or the like. A voice mail message may be stored locally to the user, in a remote location accessible by the user over a network, in a voice mail machine connected directly or indirectly to the local telephone, or the like.

A user interface, such as a telephone, may have a multiplicity of modes of operation, including text messaging, voice, video and the like. Such modes may be provided to improve the user experience and to provide for alternative methods of use, adaptable to individual preferences. The examples described herein are not meant to imply that the system or method is intended to exclude any of the multiplicity of modes of operation in performing the functions described herein.

The receiving party may access the voice mail messages present in the storage device from an actual location of the telephone number associated with the voice mailbox, or from another location using an access code, password, by manipulating buttons on the telephone or on a local voice recorder/reproducer, a computer keyboard, a personal digital assistant (PDA) or the like. Where the term "telephone" is used, it should be understood that the function of a telephone in providing speech communications between two or more parties is intended, and that this may include a cellular telephone, personal digital assistant (PDA), computing device with a headset, speaker or microphone, speakerphone, voice-to-text translator, conventional telephone, or the like.

Where the term "telephone number" is used, it should be understood to represent any communications address, Internet address, POTS or wireless telephone number or routing indicator by which the entity to be called may be reached over a communications platform. The telephone number may include, but is not limited to traditional telephone numbers, speed dial numbers, Internet addresses (e.g., e-mail address, Universal Resource Locator (URL) or website name), or other address or identifier sufficient to enable a voice or voice-equivalent connection between a user and a another entity to be made over the communications platform.

The term "communications platform" or "communications network" is understood to mean a collection of hardware and/or software, distributed between two or more entities that may have the effect of transferring data in analog, digital or mixed data formats between two or more entities. Such communications may occur over a packet-switched network like the Internet, over dedicated facilities such as wire lines or radio links, or the like. In performing such communications, the information may be subject to encoding and decoding on a carrier wave for optical or wireless transmission or may be transmitted by a modem over wire line or cables.

Alternatively, the communications platform for effecting the connection between the initiating client and the receiving client may include a conventional dial-up telephone network (commonly known as "plain old telephone service" (POTS)). The implementations of POTS may include, but are not limited to digital, optical and radio transport means, with mechanical, electrical, and optical switching. POTS includes, on at least one end of the circuit has the capability of initiating a telephone call by typing, saying or selecting a telephone number to be called. POTS functionality may be achieved by emulation in digital and Internet environments, or the like, as a hybrid format. When a POTS or POTS-compatible communications platform is used, the means of modulation of the communications address may be the dual-tone multi-frequency (DTMF) method.

An example of a hybrid communications platform is Voice Over Internet Protocol (VOIP), where one end of the voice communications connection is at a computing device connecting with the Internet through a gateway server, and the connection may be made either through the Internet to another VOIP-capable entity or through a local telephone company to a dial-up wired telephone, or a combination of such connection modes.

In an example, a POTS telephone may have a voice mail capability, such that messages may be left in audible format by a caller, by an email or the like. Notification of the presence of one or more voice mail messages may be made by one or more of a flashing light, steady light, a change to a characteristic of the dial tone, an email or text message, or the like. The user may access the voice mail message by any one of a number of techniques, which may include, but is not limited to, pressing a special button on the telephone, dialing an access number and password, issuing a voice command, or the like.

When a voice message is being replayed from a voice-mail storage device, a speech recognition application program translates the voice audio signal to text, and identifies and records sequences of recognized numbers as being associated with telephone numbers or the equivalent. Separating the telephone numbers from the remainder of the speech vocabulary is a parsing function of the speech recognition application. The occurrences of telephone number strings during a user definable time period, such as 30 seconds, is associated with a stored data representation of each of the telephone number, in a sequential order. Occurrences outside the previous 30 second period may be discarded. For simplicity, this example provides for associating one spoken telephone number in the voice mail with a data representation thereof. The parsed telephone number is stored and displayed or stored without display. Where multiple telephone numbers are given in the time period, the most recent number is used. Alternatively, the user is queried by display or audio to select from two or more telephone numbers.

It should be understood that the received audio signal is intended to mean that signal received from another entity. In some instances a telephone system generates a "sidetone" representing the user's speech for feeding back into the earpiece so that the user can have a better experience in the conversation. However for the purposes of this discussion, the sidetone signal is not part of the signal used by the speech recognition software when processing the received audio signal. The sidetone signal may be used in other embodiments.

When the user wishes to connect to a number mentioned in the voice mail, the user speaks a known word sequence such as "CALL NOW" into the microphone. The speech recognition application translates "CALL NOW" into an appropriate digital representation of the command. Herein, the correspondence between for example, the spoken words "CALL NOW" and the machine readable version thereof is represented by an alphanumeric string "call now". This conceptual correlation between voice and a digital representation thereof will be used in the later examples; for numbers, the number and the representation thereof are, respectively "123456890" and "123456890". Numbers and characters may be mixed in a string.

The string call now initiates the retrieval of the string for a telephone number recognized and stored during the past 30 seconds of the voice mail playback, and initiates a telephone call between the user and the stored telephone number 123456890. Depending on the configuration of the system, the voice mail playback may be put on hold, or discontinued and marked as having been heard, or a similar disposition. For this example, the system configuration may be such that the voice mail is terminated, the voice mail message is marked as having been heard, and a telephone call initiated to the telephone number represented by the string 123456890.

The string has been described as alphanumeric text, but any form of digital representation may be used within the processor, the memory, or the communications network to convey the information, and the representation used may not be directly or conveniently readable by a human.

The user may be provided with a display on which the telephone number is displayed for approval prior to being dialed; approval may be by voice command such as "OK", by pressing a special function key or soft key, or the like. The user may also be provided with a brief dial tone, or other indication that the apparatus has recognized and is processing the command "CALL NOW", "OK", or the like. Instead of making the voice command "CALL NOW", the user may depress a soft key or special function key to initiate the same action as a voice command. A second key or a second depression of the key may be used to signify "OK".

Once a connection is initiated in this manner, the remainder of the calling process is carried out in accordance with the detailed protocol of the particular telecommunications platform and method chosen by the user, including the termination of the call.

The phone number as recited by the voice recording may include a prefix such as "1" as is used for accessing long-distance circuits in the United States, or as required by specific area codes to access local numbers where there are overlay area codes, or the like. The user originating the connection is either identified by installed location, or by the location of the wireless or other interface with the communication platform, and the applicability of the access code is determined based on the requirements of the communications platform, such that a "1" may be deleted from the telephone number, be added to the telephone number, or the like. Similarly, the telephone may communicate with the remainder of the communications platform through a local interface such as a private automatic branch exchange (PABX), the local interface requiring an access code to enable communications with a communications platform component. Such access may require a "9", a "0" or other number or character to be added as a prefix to the telephone number. Again, this may be provided by the method and apparatus described herein, based on recognition of the location and connectivity of the user telephone. In another aspect, shorter numbers such as extensions within the local regime of the user, such as within an office or within a logical group which may be geographically dispersed, may also be recognized and stored, and dialed as described above, where the extension or speed dial number may be translated into another expanded number for actually establishing the telephone call. Often the term "dialing" a telephone number is used. It should be understood that this means the formulation and transmission of information needed to establish connectivity between a user and another telephone, where the term telephone is meant broadly as previously explained.

In another example, the user may be in conversation with another entity, without the need for a voice mail replay. This may involve another person using another telephone, or be with an automated response facility as is used for obtaining information from businesses or for ordering merchandise, or making reservations. During the course of this interaction, the entity may indicate by speech that another telephone number is appropriate for the interaction that the user intends. For various reasons, some of them economic rather than technical in character, the one entity may indicate that a telephone call must be placed by the user to another entity as a new connection, rather than as an automated transfer of the connection.

The voice recognition application servicing the user may perform a similar function to that described in conjunction with voice mail, and recognize and store alphanumerical strings recognized as telephone numbers for a user selectable period on the recent past. The actions taken by the user may be the same or similar to the actions described for responding to a voice mail.

In a situation where the one entity is a person, and the intention of the person is to provide a telephone number for a conference call between the user, the first entity and a second entity, a suitable sequence of voice commands may be "HOLD", "CALL NOW", and when the connection to the second entity has been established satisfactorily, "CONFERENCE". The "CONFERENCE" command results in the merging of the connections between the person, the user, and the last called party. A number of voice commands may be established for any specific example of an apparatus and method, and the selection of the voice commands may be configured for all users, or for a specific user, depending on preference.

In this manner, telephone numbers identified by voice recognition application associated with a user telephone may be employed to initiate connections with the entity associated with the spoken telephone number without the necessity for the user to physically transcribe the telephone number using a pencil, pen, or the like.

FIG. 1 illustrates an aspect of the system and method, where a human user 10 may interact with a telephone handset 12, having a speaker 14 for reproducing the audio signal received by the terminal equipment 18 from the remainder of the communications network 20. The handset 12 also has a microphone 16 for receiving the spoken audio of the user and conveying the information to the terminal equipment through connection 22. It should be understood that the connection 22 between the terminal equipment 18 and the handset 12, although shown as a physical connection, may also be by optical, acoustic or wireless methods. Similarly the connection between the terminal equipment 18 and the remainder of the communications network 20, may also be by any of the variety of technologies previously mentioned.

FIG. 2 illustrates a detail of the communications network relating to the terminal equipment 18. The terminal equipment 18 may include a processor 30, memory 32 and an A/D and D/A converter. The terminal equipment 18 may be located near or at the user location or the equivalent functions performed at any convenient point on or off the communications network. For example, the voice mail function may be co-located with the speech recognition function, and both of them may be located at a telephone central office or at a server identified by URL (uniform resource locator) address on the Internet.

A method of telephony may include: processing an audio signal (digital or analog) representing spoken words to identify alphanumeric data representing the connection address of another entity; storing a data string representing the connection address of the another entity; recognizing a predetermined voice command of the user; and, initiating a connection request message.

In an aspect, a method of telephony may further include: accessing a voice mail or other recorded message.

In yet another aspect, the step of initiating a connection request message may include at least one of: modifying the stored connection address in accordance with the logical or physical association of the user and the entity represented by the connection address; displaying the connection address for the user to validate; placing the present connection hold; connecting the first entity, a second entity and the user; marking a voice mail message as heard; marking a voice mail message as unheard; or, disconnecting the connection to a first entity and initiating a connection to a second entity.

As shown in FIG. 3, the method 500 includes: receiving the audio data 510; using speech a recognition application program to convert at least telephone numbers to text 520; identifying and storing telephone numbers 530; deleting stored telephone numbers after a user-specified period of time 540; reproducing the received audio data for the user 550; accepting user audio input 560; converting the input audio to test using a speech recognition application program 570; identifying the presence of a command word in the speech input 580; retrieving the associated stored telephone number 600; and "dialing" the number 610.

It is therefore intended that the foregoing detailed description be regarded as illustrative rather than limiting, and that it be understood that it is the following claims, including all equivalents, that are intended to define the spirit and scope of the invention.

What is claimed is:

1. A system, comprising:
a source of audio information operable to provide the audio information during a first connection, wherein the audio information includes at least one communications address and speech vocabulary; and
a first processor operable to automatically separate the communications address from the speech vocabulary within the audio information by identifying one or more sequences of characters which correspond to the at least one communications address during a time period and discarding one or more occurrences of communications address strings which correspond to the at least one communications address outside the time period, the first processor being further operable to hold the first connection and initiate a second connection using the communications address; and
wherein the communications address is an Internet address, a telephone number, or routing indicator.

2. The system of claim 1, further comprising: a memory; a second processor configured to accept and store data representing spoken information.

3. The system of claim 2, wherein the first and second processors are the same processor.

4. The system of claim 1, wherein a message is comprised of a communications address modulated on a carrier wave.

5. The system of claim 4, wherein the message is modulated in dual-tone multi-frequency (DTMF) format.

6. The system of claim 4, wherein the carrier wave is propagated on at least one of a wire, an optical signal, or a radio frequency signal.

7. The system of claim 1, further comprising an interface to one or more of the public switched telephone network, the Internet, or a wireless communications network.

8. The system of claim 1, wherein the first processor is operable to connect as a function of the communications address in response to a command.

9. A method of telephony, the method comprising:
receiving a signal during a connection;
automatically separating a first speech waveform from speech vocabulary waveform in the received signal, and identifying one or more sequences of numbers which correspond to at least one telephone number during a time period and discarding one or more occurrences of telephone number strings which correspond to the at least one telephone number outside the time period, wherein the first speech waveform corresponds to the at least one telephone number;
storing the telephone number in a memory; and
recognizing a second speech waveform received by a microphone as a functional command,
wherein, where the functional command is associated with holding the connection and dialing a stored telephone number, further comprising:
holding the connection and formulating a transmission compatible with a communications network, including the stored telephone number; and
modulating the transmission on a carrier.

10. The method of claim 9, wherein the stored telephone number is modified to account for the logical or physical relationship a user telephone and a second telephone.

11. The method of claim 9, wherein the received signal is a voice mail.

12. The method of claim 9, wherein a user is notified of a voice mail by at least one of an indicator light, a sound, an email or a display of a text message.

13. The method of claim 11, wherein the stored telephone number is a first telephone number and a second telephone number, and the functional command selects between the first telephone number and the second telephone number.

14. The method of claim 10, wherein the stored telephone number is displayed prior to the step of modulating.

15. The method of claim 14, wherein a further voice command is required prior to the step of modulating.

16. The method of claim 14, wherein activating a function key is required prior to the step of modulating.

17. A telephony method, the method comprising:
receiving audio information during a connection;
automatically separating, with a processor, a telephone number from speech vocabulary within the received audio information;
identifying one or more sequences of numbers which correspond to the telephone number during a time period and discarding one or more occurrences of telephone number strings which correspond to the telephone number outside the time period;
receiving a functional command associated with holding a connection and dialing the telephone number; and
holding the connection and dialing the telephone number as a function of the functional command.

18. The method of claim 17 wherein dialing comprises formulating a transmission compatible with a communications network, and modulating the transmission on a carrier wave.

19. The method of claim 17 wherein receiving the functional command comprises recognizing, with the processor or a different processor, the functional command from additional audio information.

20. The method of claim 17 further comprising storing the telephone number in a memory.

* * * * *